Patented Apr. 12, 1949

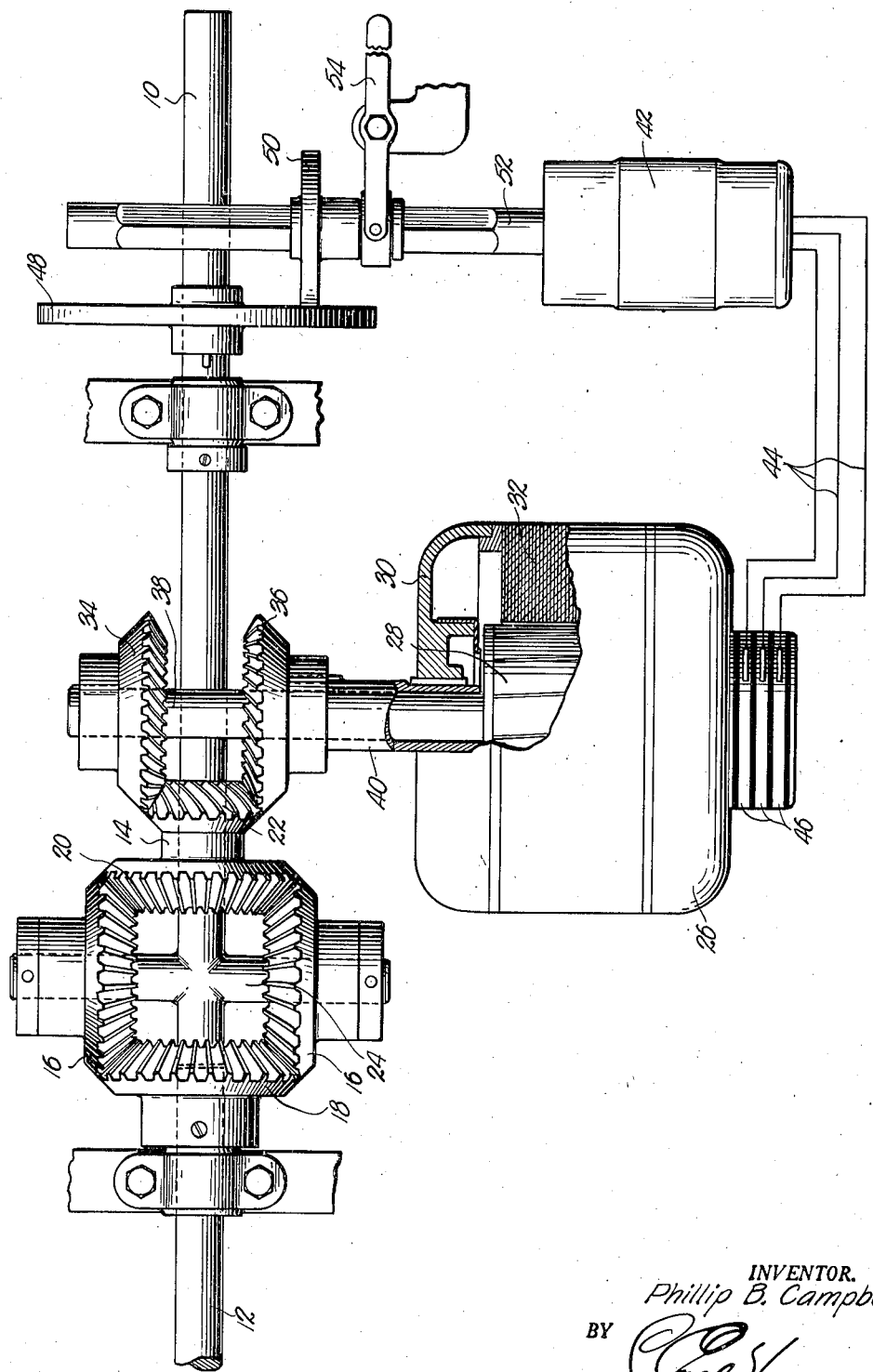

2,466,762

UNITED STATES PATENT OFFICE 2,466,762

VARIABLE POWER TRANSMISSION

Phillip B. Campbell, Kansas City, Mo., assignor of one-half to Phillip D. Campbell, Kansas City, Mo.

Application April 15, 1946, Serial No. 662,367

7 Claims. (Cl. 74—686)

This invention relates to the art of power transmission and particularly to structure interposable between a drive and a driven shaft to transfer power from the former to the latter and the primary object is the provision of such equipment wherein is embodied novel and unique means for infinitely varying the speed of the driven shaft as the drive shaft is constantly rotated by a prime mover.

This invention has for a further important aim to provide a variable power transmission having an unique train of gears including a retardable element with which is associated means for electrically braking the said element to vary the speed of the transmission and, therefore, the driven shaft with which the transmission is associated.

A yet further object of this invention is to provide an infinitely variable power transmission wherein is incorporated magnetic means for cooperating with certain of a number of gears constituting a coupling between a drive and a driven shaft to vary the speed ratio between the former and the latter, which magnetic means is energized by current from an alternator driven at selected desirable speeds through parts motivated by the drive shaft or by any independent means.

The mode of operating the elements constituting the variable power transmission and the specific way of constructing and combining the component elements of said transmission are of importance and constitute additional objects of the invention, all of which will appear during the course of the following specification referring to the accompanying drawing wherein is diagrammatically illustrated a variable power transmission made pursuant to my invention.

The transmission chosen for illustration comprises five sections or groups of parts, the first of which includes a drive shaft 10 operably joined to any prime mover (not here shown), a driven shaft 12 and gears 16 and 18 interconnecting the proximal ends of shafts 10 and 12. A member 14, freely rotatable on drive shaft 10 has gears 20 on one face thereof in mesh with gears 16. The other face 22 of member 14 is an hypoid member for reasons more fully hereinafter set down.

A crossarm 24 on drive shaft 10 constitutes a pair of diametrically opposite members upon which gears 16 are mounted for free rotation about their aligned axes on the crosshead 24. These gears 16 are also in mesh with bevel gear 18 rigid to driven shaft 12. A socket in gear 18 receives the end of drive shaft 10 to stabilize the entire planetary assembly. Magnetic means generally designated by the numeral 26 includes an armature 28, a pole carrying portion 30 and field coils 32. This magnetic means 26 constitutes the second important element of the transmission and is joined to the above described assembly of gears and shafts by a pair of hypoid gears 34 and 36, both of which are in mesh with hypoid member face 22 of member 14.

Gear 34, forming a part of the third section of the transmission, is rigid to shaft 38 intersecting the axis of drive shaft 10 to one side thereof and attached to armature 28 for rotation therewith. Hypoid gear 36 is mounted upon a tubular shaft 40 circumscribing a portion of shaft 38 and secured to the pole carrying portion 30 of magnetic means 26. Gear 36, like gear 34, is in mesh with face 22 of member 14. This magnetic means 26 is similar to a squirrel-cage induction motor with the armature and pole carrying portion rotating in opposite directions by virtue of the structure just set down.

The size of gears 34 and 36 is the same and therefore, armature 28 and member 30 of magnetic means 26 will always be rotated at the same speed but in opposite directions by member 14 when drive shaft 10 is rotated.

Field coils 32 of magnetic means 26 may be energized by current generated in an alternator 42, joined to field coils 32 of magnetic means 26 by conductors 44 of known characteristics that carry current to slip rings 46. This generator or alternator 42 is the fourth main element of the variable transmission and supplies alternating current for clutch excitation. The output of generator 42 may be controlled by varying the speed of the generator 42 through the medium of the fifth assembly of parts constituting a unit of the transmission.

This assembly of parts establishes driving connection between generator 42 and drive shaft 10 and has a disk 48 rigid to drive shaft 10 in frictional engagement with a disk of lesser diameter mounted for longitudinal movement along squared shaft 52 of generator 42. Small disk 50 is shiftable manually by any connection such as lever 54 having means (not shown) for holding the same in selected positions and as the small disk 50 is moved toward and from the axis of drive shaft 10, the speed of generator 42 will be decreased and increased respectively.

The simple generator drive just described is possible because clutch excitation power required is very small when considering the prime mover power transmitted through drive shaft 10. A low capacity variable drive constituting the parts just defined is satisfactory.

During the normal operation of the transmission, gears 16 move in their orbit with the supporting crossarm 24. If member 14 is allowed to turn freely when a load is on driven shaft 12, no power will be transmitted through the chain of gears from drive shaft 10. Driven shaft 12 will, therefore, not be actuated and member 14 will rotate freely at twice the speed of drive shaft 10 and power may be transmitted to driven shaft 12 through gear 18 only by retarding the rotation of member 14 and reducing its speed to a point less than twice the rotative speed of drive shaft 10. At the speed of rotation of this member 14 is decreased relative to the speed of rotation of drive shaft 10, the rotative speed of gear 18 and driven shaft 12 is increased. Thus an infinitely variable transmission is obtainable provided the means for controlling the speed of rotation of member 14 is brought into play.

The electrical means above described and diagrammatically illustrated is practical and found to be satisfactory. Remembering that hypoid gears 34 and 36 rotate in opposite directions and that likewise their associated parts (28 and 30) of magnetic means 26 rotate in opposite directions, it will be clear that excitation of field coils 32 will serve to control the speed of rotation of member 14. If field coils 32 of magnetic means 30 are energized with alternating current in a manner resulting in the field "rotating" electrically in a direction opposite to its mechanical rotation, the resulting speed of members 28 and 30 would be maintained at one-half the synchronous speed of the field relative to the field portion of the clutch. Thus, the speed of rotation of member 14 is controlled by varying the clutch excitation frequency. This is done by varying the speed of generator 42 by suitably manipulating disk 50.

A typical example of transmission operation may be tabulated as follows:

Number of poles on the pole carrying portion of magnetic means 26_____ 6
Prime mover speed or speed of rotation of drive shaft 10_____R. P. M__ 1000
Gear ratio, hypoid gear 22 to gears 34 and 36 _____ 2 to 1
Desired speed of driven shaft 12__R. P. M__ 300
Magnetic means 28 and 30 rotate in opposite direction at_____R. P. M__ 850
Resultant speed of separation of magnetic means _____R. P. M__ 1700

In order that the magnetic means may be maintained at the resultant speed of separation of 1700 R. P. M. the "revolving" field set up in the pole carrying portion 30 of the magnetic means must have a synchronous speed of 1700 R. P. M. relative to the pole portion and in opposite direction to that of the mechanical rotation. This places the "revolving" field in step with the center portion of the magnetic means.

Excitation frequency required is, therefore:

$$\frac{f}{3} \text{ equals } \frac{1700}{60}$$

$f$ equals 85 cyc./sec.

Assuming a final drive speed of 900 R. P. M. is desired with a 1000 R. P. M. drive shaft speed, the excitation frequency required would be:

$$\frac{f}{3} \text{ equals } \frac{1100}{60}$$

$f$ equals 55 cyc./sec.

It has been set down above the manner in which this variable frequency may be obtained through the employment of generator 42 and while it has been disclosed to be means for varying the speed of generator 42, it is obvious that varying the number of poles of the alternator or generator supplying the exciting power will accomplish the same result. Electrically loading portions of the variable power transmission to retard the movement of one of the elements of the assembly is accomplished through employment of the magnetic means 26 and it is the use of such an element in a transmission assembly that permits reaching the effective and efficient mode of operation capable of emanating from the transmission above described and diagrammatically shown in the drawing referred to throughout the specification.

It is realized that variable power transmissions having characteristics different from those described and illustrated may be made without departing from the spirit of the invention or scope of the appended claims.

Having thus described the invention, what I claim as new and desire to secure by Letters Patent is:

1. In a variable power transmission of the character described having a drive shaft and a driven shaft, structure interconnecting the drive shaft and the driven shaft, including a movable element adapted to progressively increase the speed ratio between the drive shaft and the driven shaft as the movement of said element is retarded; magnetic means for retarding the movement of the element; and a generator driven by the drive shaft for supplying current to the said magnetic means, said generator having a variable driving connection with the drive shaft.

2. In a variable power transmission having a drive shaft and a driven shaft, a crossarm on the drive shaft having a pair of spaced beveled gears mounted thereon for free rotation, a gear rigid to the driven shaft in mesh with the bevel gears of the crossarm; a member having a pair of opposed, bevel gears integral therewith, said member being mounted on the drive shaft for free rotation, with one of the gears thereof in mesh with the bevel gears of the crossarm; magnetic means having an armature and a pole carrying portion; a pair of hypoid gears in mesh with the other gear of the member; a shaft rigid with one of the hypoid gears and joined to the armature of the magnetic means; a member connecting the other hypoid gear and the pole carrying portion of the said magnetic means; and a generator for energizing the magnetic means.

3. In a variable power transmission having a drive shaft and a driven shaft, a crossarm on the drive shaft having a pair of spaced bevel gears mounted thereon for free rotation, a gear rigid to the driven shaft in mesh with the bevel gears of the crossarm; a member having a pair of opposed gears integral therewith, said member being mounted on the drive shaft for free rotation thereon, with one of the opposed gears thereof in mesh with the bevel gears of the crossarm; a pair of spaced hypoid gears in mesh with the other of said opposed gears of the member, said hypoid gears having coaxial axes; and means for retarding the rotation of said hypoid gears whereby to reduce the speed of rotation of said member as the latter is rotated by said drive shaft through said hypoid gears.

4. In a variable power transmission as set forth in claim 3 wherein said means comprises magnetic apparatus having an armature and a pole carrying portion operably connected with each of said hypoid gears respectively, and electrical means tending to rotate the armature and pole carrying portion in opposite directions.

5. In a variable power transmission as set forth in claim 3 wherein said means comprises magnetic apparatus having a rotatable armature joined to one of said hypoid gears and a pole carrying portion rotatably mounted on said armature and joined to the other of said hypoid gears, and a generator so connected electrically to the armature and to the pole carrying portion to tend to rotate the armature and said portion in opposite directions.

6. In a variable power transmission as set forth in claim 3 wherein said means comprises magnetic apparatus having a rotatable armature joined to one of said hypoid gears and a pole carrying portion rotatably mounted on said armature and joined to the other of said hypoid gears, and a generator so connected electrically to the armature and to the pole carrying portion to tend to rotate the armature and said portion in opposite directions, said generator having a rotatable armature and means to vary the speed of rotation thereof, whereby to vary the excitation of said magnetic apparatus.

7. In a variable power transmission having a drive shaft and a driven shaft, a crossarm on the drive shaft having a pair of spaced bevel gears mounted thereon for free rotation; a gear rigid to the driven shaft in mesh with the bevel gears of the crossarm; a member having a pair of opposed bevel gears integral therewith, said member being mounted on the drive shaft for free rotation, with one of the gears thereof in mesh with the bevel gears of the crossarm; magnetic means having an armature, field coils, and a pole carrying portion; a pair of hypoid gears in mesh with the other gear of the member; a shaft rigid with one of the hypoid gears and joined to the armature of the magnetic means; a tubular shaft circumscribing a portion of the last-mentioned shaft and connecting the other hypoid gear and the pole carrying portion of the said magnetic means; a generator for energizing the field coils of the magnetic means with current of desired frequency, said hypoid gears meshing with said other gear of the member and having coaxial axes, whereby said armature and the said pole carrying portion are rotated in opposite directions by the hypoid gears, said field coils being so electrically connected to the generator to cause the resulting magnetic field to rotate counter to the rotation of said pole carrying portion; and means for varying the excitation frequency, of the magnetic means whereby to control the speed of rotation of the member and to vary the speed ratio between the driven shaft and the drive shaft through said hypoid gears and said member.

PHILLIP B. CAMPBELL.

REFERENCES CITED

The following references are of record in the file of this patent:

UNITED STATES PATENTS

| Number | Name | Date |
|---|---|---|
| 1,223,400 | Kurtz | Apr. 24, 1917 |
| 1,265,078 | Grote | May 7, 1918 |
| 1,954,822 | Low | Apr. 17, 1934 |
| 2,156,372 | Campbell | May 2, 1938 |

FOREIGN PATENTS

| Number | Country | Date |
|---|---|---|
| 142,603 | Great Britain | May 13, 1920 |